(12) United States Patent
Wang et al.

(10) Patent No.: US 8,910,301 B2
(45) Date of Patent: Dec. 9, 2014

(54) SYSTEM AND METHOD FOR LOCKING AND UNLOCKING STORAGE DEVICE

(75) Inventors: Ching-Hsien Wang, Miaoli County (TW); Chia-Jung Hsu, Yilan County (TW)

(73) Assignee: Phison Electronics Corp., Miaoli (TW)

( * ) Notice: Subject to any disclaimer, the term of this patent is extended or adjusted under 35 U.S.C. 154(b) by 108 days.

(21) Appl. No.: 13/366,373

(22) Filed: Feb. 6, 2012

(65) Prior Publication Data

US 2013/0151858 A1   Jun. 13, 2013

(30) Foreign Application Priority Data

Dec. 8, 2011   (TW) .............................. 100145337 A

(51) Int. Cl.
*G06F 7/04* (2006.01)
*G06F 21/34* (2013.01)
*G06F 12/14* (2006.01)
*G06F 17/30* (2006.01)

(52) U.S. Cl.
CPC ............ *G06F 21/34* (2013.01); *G06F 12/1466* (2013.01)
USPC ........ 726/27; 726/2; 726/16; 726/17; 726/21; 726/26; 726/28; 713/182; 713/183; 713/184; 713/185

(58) Field of Classification Search
CPC ....... G06F 21/34; G06F 21/44; G06F 21/123; G06F 21/62; G06F 21/73; G06F 21/74; G06F 12/1466; G06F 21/78
USPC ........ 713/182–185; 726/2, 16–17, 21, 26–28; 66/182–183
See application file for complete search history.

(56) References Cited

U.S. PATENT DOCUMENTS

| | | | | |
|---|---|---|---|---|
| 7,461,249 B1 * | 12/2008 | Pearson et al. | ................ | 713/156 |
| 8,037,319 B1 * | 10/2011 | Clifford | ........................ | 713/193 |
| 8,719,923 B1 * | 5/2014 | Miller et al. | ..................... | 726/20 |
| 2002/0055847 A1 * | 5/2002 | Nakano et al. | .................... | 705/1 |
| 2005/0130745 A1 * | 6/2005 | Dernis et al. | .................... | 463/43 |
| 2006/0209359 A1 * | 9/2006 | Kadowaki | ..................... | 358/474 |
| 2007/0016941 A1 * | 1/2007 | Gonzalez et al. | ................ | 726/9 |
| 2007/0021141 A1 * | 1/2007 | Yokota et al. | .............. | 455/550.1 |
| 2007/0061888 A1 * | 3/2007 | Selinfreund | .................... | 726/26 |
| 2007/0239988 A1 * | 10/2007 | Atzmony et al. | ............. | 713/183 |
| 2008/0276059 A1 * | 11/2008 | Horiuchi et al. | ............. | 711/163 |
| 2009/0172279 A1 * | 7/2009 | Yuan et al. | ..................... | 711/115 |
| 2009/0248975 A1 * | 10/2009 | Daud et al. | .................... | 711/112 |
| 2010/0031349 A1 * | 2/2010 | Bingham | ........................ | 726/20 |
| 2010/0075604 A1 * | 3/2010 | Lydon et al. | ................ | 455/41.3 |
| 2010/0082961 A1 * | 4/2010 | Gurumoorthy et al. | ......... | 713/2 |

(Continued)

*Primary Examiner* — Michael Simitoski
(74) *Attorney, Agent, or Firm* — Jianq Chyun IP Office

(57) ABSTRACT

A storage device protection system including a protection control unit, a detection unit, an account/password input unit, an ID acquiring unit, and an encryption unit is provided. The detection unit determines whether a storage device and a key storage device are both coupled to a host. The account/password input unit receives an administrator ID and an administrator password. The ID acquiring unit obtains IDs of the storage device and the key storage device. The encryption unit encrypts the administrator ID, the administrator password, and the IDs of the storage device and the key storage device into encryption data. The protection control unit stores the encryption data into the key storage device and sets an access mode of the storage device as a protection status according to the administrator ID and the administrator password. Thereby, the storage device can be effectively unlocked by using the key storage device.

16 Claims, 7 Drawing Sheets

(56) References Cited

U.S. PATENT DOCUMENTS

| | | | |
|---|---|---|---|
| 2010/0185843 A1* | 7/2010 | Olarig et al. ...................... 713/2 |
| 2010/0217992 A1* | 8/2010 | Hamlin et al. ................ 713/176 |
| 2011/0010517 A1* | 1/2011 | Fujimura et al. .............. 711/164 |
| 2011/0113235 A1* | 5/2011 | Erickson ....................... 713/152 |
| 2011/0136471 A1* | 6/2011 | Chen et al. .................... 455/411 |
| 2011/0216341 A1* | 9/2011 | Moro ........................... 358/1.13 |
| 2011/0231939 A1* | 9/2011 | Mann et al. ..................... 726/27 |
| 2013/0167228 A1* | 6/2013 | Wong .............................. 726/19 |

\* cited by examiner

SYSTEM AND METHOD FOR LOCKING AND UNLOCKING STORAGE DEVICE

CROSS-REFERENCE TO RELATED APPLICATION

This application claims the priority benefit of Taiwan application serial no. 100145337, filed on Dec. 8, 2011. The entirety of the above-mentioned patent application is hereby incorporated by reference herein and made a part of this specification.

BACKGROUND

1. Technology Field

The present invention generally relates to a storage device protection technique, and more particularly, to a storage device protection system capable of securely backing up an administrator ID and an administrator password and methods thereof for locking and unlocking a storage device.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and high access speed. A solid state drive (SSD) is a memory storage device which uses a flash memory as its storage medium. Thus, in recent years, the flash memory industry has become a major part of the electronic industry.

In some applications, a storage device provides a protection mechanism so as to allow a user to set the storage device into a protection status. Namely, the user can set up an administrator ID and an administrator password and lock the storage device according to the administrator ID and the administrator password. To access the locked storage device, correct administrator ID and administrator password have to be input to unlock the storage device, so that data stored in the storage device is prevented from being accessed by unauthorized users. Particularly, when someone inputs incorrect administrator ID and administrator password for more than a predetermined number of times, the storage device will be permanently locked and data stored therein will not be accessible anymore, so that the protection mechanism is prevented from being cracked by unauthorized users through repeated trial and error attacks. However, a storage device may be permanently locked if a user forgets his/her password. Thereby, how to allow a user to unlock a storage device even when the user forgets his/her ID or password has become a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the present invention is directed to a storage device protection system and methods thereof for locking and unlocking a storage device, in which an administrator ID and an administrator password can be obtained through a key storage device to unlock the storage device when the administrator ID and the administrator password are forgotten.

According to an exemplary embodiment of the present invention, a storage device protection system including a protection control unit, a detection unit, an account/password input unit, an ID acquiring unit and an encryption unit is provided. The detection unit is coupled to the protection control unit, and configured for determining whether a storage device and a key storage device are both coupled to a host. The account/password input unit is coupled to the protection control unit, and configured for receiving an administrator ID and an administrator password. The ID acquiring unit is coupled to the protection control unit, and when the storage device and the key storage device are both coupled to the host, the ID acquiring unit obtains an ID of the storage device as a first ID and an ID of the key storage device as a second ID. The encryption unit is coupled to the protection control unit, and configured for encrypting the administrator ID, the administrator password, the first ID, and the second ID into an encryption data. The protection control unit stores the encryption data into the key storage device and instructs a controller of the storage device to set an access mode of the storage device as a protection status according to the administrator ID and the administrator password.

According to an exemplary embodiment of the present invention, a storage device protection system including a protection control unit, a detection unit, an ID acquiring unit, and a decryption unit is provided. The detection unit is coupled to the protection control unit, and configured for determining whether a storage device and a key storage device are both coupled to a host. The ID acquiring unit is coupled to the protection control unit, and when the storage device and the key storage device are both coupled to the host, the ID acquiring unit obtains an ID of the storage device and an ID of the key storage device. The decryption unit is coupled to the protection control unit. The protection control unit reads an encryption data from the key storage device, and the decryption unit decrypts the encryption data to obtain an administrator ID, an administrator password, a first ID, and a second ID. The protection control unit determines whether the first ID and the second ID are respectively the same as the ID of the storage device and the ID of the key storage device obtained by the ID acquiring unit. When the first ID and the second ID are respectively the same as the ID of the storage device and the ID of the key storage device obtained by the ID acquiring unit, the protection control unit instructs a controller of the storage device to set an access mode of the storage device as a non-protection status by using the administrator ID and the administrator password.

According to an exemplary embodiment of the present invention, a storage device locking method is provided. The storage device locking method includes determining whether a storage device and a key storage device are both coupled to a host and executing a locking operation when the storage device and the key storage device are both coupled to the host. The storage device locking operation also includes receiving an administrator ID and an administrator password, obtaining an ID of the storage device as a first ID, and obtaining an ID of the key storage device as a second ID. The storage device locking operation still includes encrypting the administrator ID, the administrator password, the first ID, and the second ID into an encryption data and storing the encryption data into the key storage device. The storage device locking operation further includes determining whether the encryption data is successfully stored into the key storage device and instructing a controller of the storage device to set an access mode of the storage device as a protection status according to the administrator ID and the administrator password when the encryption data is successfully stored into the key storage device.

According to an exemplary embodiment of the present invention, a storage device unlocking method is provided. The storage device unlocking method includes determining whether a storage device and a key storage device are both coupled to a host and executing an unlocking operation when the storage device and the key storage device are both coupled to the host. The storage device unlocking operation also includes obtaining an ID of the storage device and an ID of the key storage device, reading an encryption data from the key storage device, and decrypting the encryption data to obtain an administrator ID, an administrator password, a first ID, and a second ID. The storage device unlocking operation still includes determining whether the first ID and the second ID are respectively the same as the ID of the storage device and the ID of the key storage device and instructing a controller of the storage device to set an access mode of the storage device as a non-protection status by using the administrator ID and the administrator password when the first ID and the second ID are respectively the same as the ID of the storage device and the ID of the key storage device.

As described above, exemplary embodiments of the present invention provide methods for locking and unlocking a storage device and a storage device protection system using the same, in which an administrator ID, an administrator password, and IDs of the storage device and a key storage device coupled to a host are encrypted into an encryption data and stored into the key storage device. When a user forgets his/her ID or password, the user can unlock the storage device by using the key storage device. In particular, the key storage device used for unlocking the storage device has to be the same key storage device used for locking the storage device in order to ensure the security of the storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
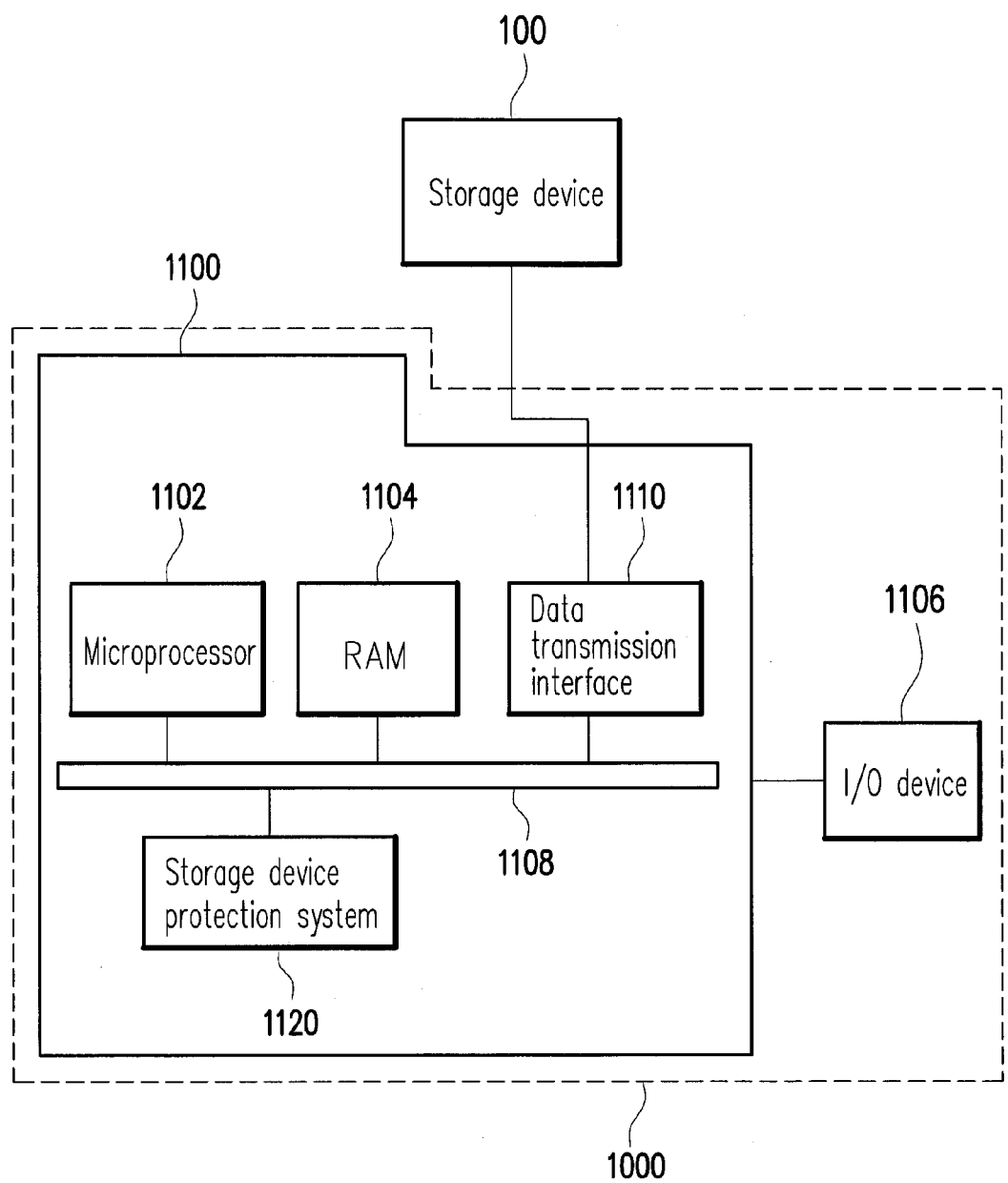
FIG. 1A illustrates a host and a storage device according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A storage device (also referred to as a memory storage system) usually includes a rewritable non-volatile memory module and a controller (also referred to as a control circuit). A storage device is usually used along with a host so that the host can write data into or read data from the storage device.

FIG. 1A illustrates a host and a storage device according to the first exemplary embodiment of the present invention.

Figure 1B:
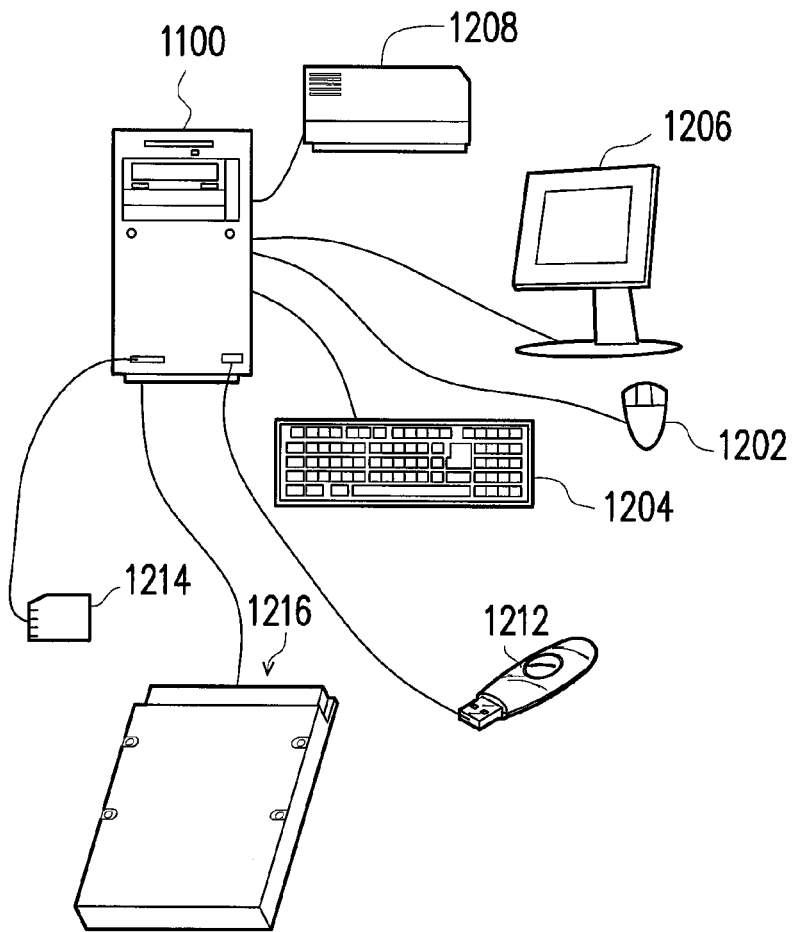
FIG. 1B is a diagram of a computer, an input/output (I/O) device, and a storage device according to an exemplary embodiment of the present invention.

Referring to FIG. 1A, the host 1000 includes a computer 1100 and an input/output (I/O) device 1106. The computer 1100 includes a microprocessor 1102, a random access memory (RAM) 1104, a system bus 1108, a data transmission interface 1110, and a storage device protection system 1120. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, a storage device 100 is coupled to other components of the host 1000 through the data transmission interface 1110. Data can be written into or read from the storage device 100 through operations of the microprocessor 1102, the RAM 1104, and the I/O device 1106. The storage device 100 is a rewritable non-volatile memory storage device, such as the flash drive 1212, the memory card 1214, or the solid state drive (SSD) 1216 illustrated in FIG. 1B.

Figure 1C:
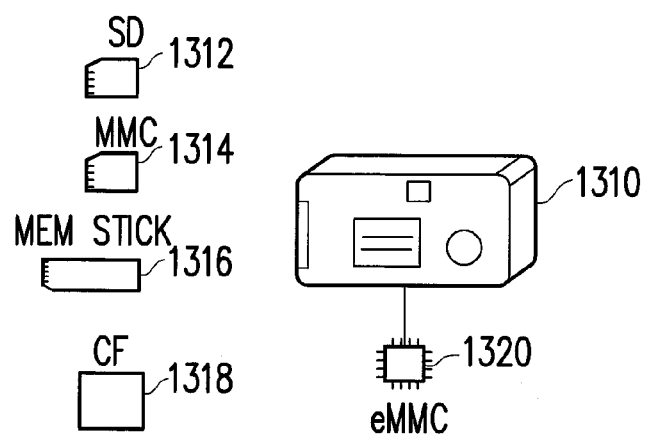
FIG. 1C is a diagram of a host system and a storage device according to an exemplary embodiment of the present invention.

Generally speaking, the host 1000 may be any system that can work with the storage device 100 to store data. Even though the host 1000 is described as a computer system in the present exemplary embodiment, in another exemplary embodiment of the invention, the host 1000 may also be a digital camera, a video camera, a communication device, an audio player, or a video player. For example, if the host is a digital camera (video camera) 1310, the rewritable non-volatile memory storage device is then a secure digital (SD) card 1312, a multimedia card (MMC) card 1314, a memory stick (MS) 1316, a compact flash (CF) card 1318, or an embedded storage device 1320 (as shown in FIG. 1C) used by the digital camera 1310. The embedded storage device 1320 includes an embedded MMC (eMMC). It should be mentioned that an eMMC is directly coupled to the motherboard of a host.

Figure 2:
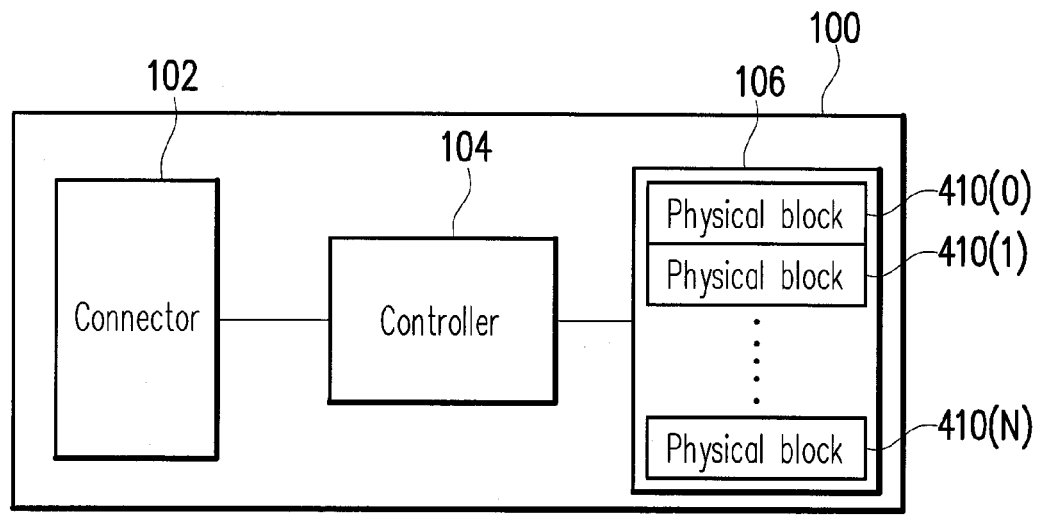
FIG. 2 is a schematic block diagram of the storage device in FIG. 1A.

FIG. 2 is a schematic block diagram of the storage device in FIG. 1A.

Referring to FIG. 2, the storage device 100 includes a connector 102, a controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the SD interface standard, the MS interface standard, the MMC interface standard, the CF interface standard, the integrated device electronics (IDE) standard, or any other suitable standard.

The controller 104 executes a plurality of logic gates or control instructions implemented in a hardware form or a firmware form and performs various data operations on the rewritable non-volatile memory module 106 according to commands issued by the host 1000.

The rewritable non-volatile memory module 106 is coupled to the controller 104 and configured for storing data written by the host 1000. The rewritable non-volatile memory module 106 has physical blocks 410(0)-410(N). The physical blocks 410(0)-410(N) may belong to the same memory die or different memory dies.

Referring to FIG. 1A again, the host 1000 includes a storage device protection system 1120. The storage device protection system 1120 sets an access mode of the storage device 100 as a protection status (i.e., locks the storage device 100) according to an administrator ID and an administrator password set up by a user and sets the access mode of the storage device 100 as a non-protection status (i.e., unlocks the storage device 100) according to received administrator ID and administrator password. When the access mode of the storage device 100 is set as the protection status, the host 1000 cannot access data stored in the storage device 100. Namely, no one can access data stored in the storage device 100 before the storage device 100 is unlocked.

In particular, when the administrator ID and the administrator password are set up, the storage device protection system 1120 may configure a storage device as a key storage device for unlocking the storage device 100.

Figure 3:
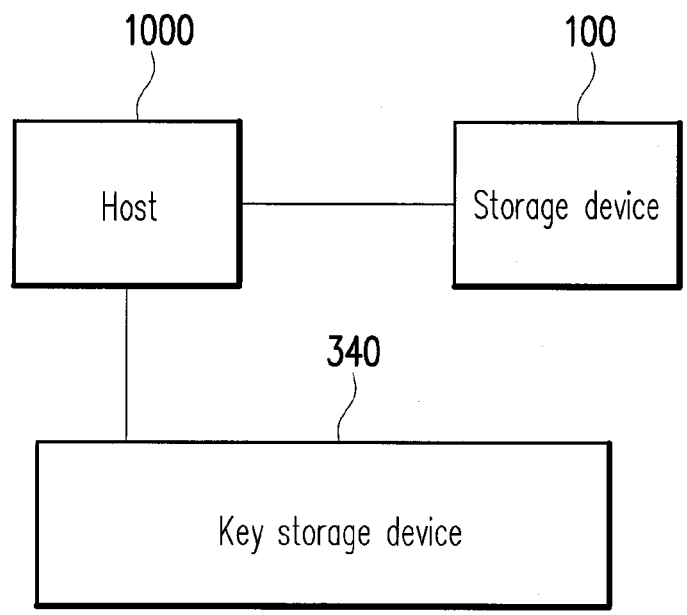
FIG. 3 illustrates a diagram of operating a host, a storage device, and a key storage device according to the first exemplary embodiment of the present invention.

FIG. 3 illustrates a diagram of operating a host, a storage device, and a key storage device according to the first exemplary embodiment of the present invention.

Referring to FIG. 3, while setting the access mode of the storage device 100 as the protection status according to the administrator ID and the administrator password set up by the user, the storage device protection system 1120 further encrypts validation data used for unlocking the storage device 100 and backs up the encrypted data into a key storage device 340. And, the key storage device 340 may be used for unlocking the storage device 100. Namely, if an owner of the storage device 100 sets up an administrator ID and an administrator password to lock the storage device 100 and forgets the administrator ID and the administrator password later on, the owner of the storage device 100 may unlock the storage device 100 by using the key storage device 340.

In the present exemplary embodiment, the storage device 100 is a solid state drive (SSD), and the key storage device 340 is a flash drive. However, the types of the storage device 100 and the key storage device 340 are not limited in the present invention, and in other embodiments, the storage device 100 may also be a flash drive and the key storage device 340 may also be a SSD.

Figure 4A:
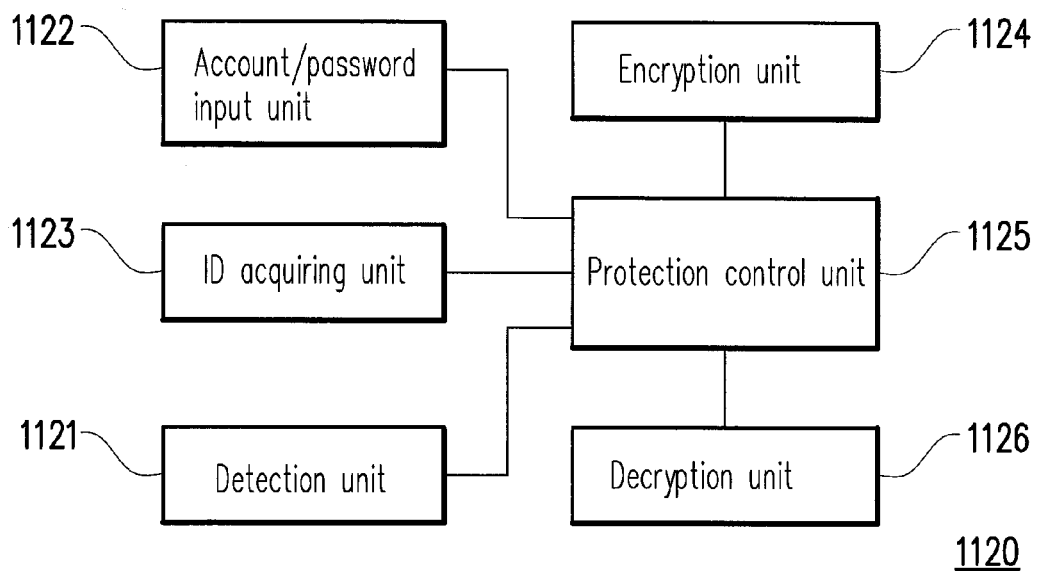
FIG. 4A is a schematic block diagram of a storage device protection system according to the first exemplary embodiment of the present invention.

FIG. 4A is a schematic block diagram of a storage device protection system according to the first exemplary embodiment of the present invention.

Referring to FIG. 4A, the storage device protection system 1120 includes a detection unit 1121, an account/password input unit 1122, an ID acquiring unit 1123, an encryption unit 1124, a protection control unit 1125, and a decryption unit 1126.

The detection unit 1121 is coupled to the protection control unit 1125 and configured to determine whether the storage device 100 and the key storage device 340 are both coupled to a host 1000. The detection unit 1121 may be a microprocessor or an application-specific integrated circuit (ASIC). The detection unit 1121 determines whether the storage device 100 and the key storage device 340 are both coupled to the host 1000 when a user is about to set the storage device 100 to a protection status to start the storage device protection system 1120. If the detection unit 1121 determines that the storage device 100 or the key storage device 340 is not coupled to the host 1000, the detection unit 1121 displays a locking failure message in a display unit (not shown) of the host 1000 to inform the user about the locking failure.

The account/password input unit 1122 is coupled to the protection control unit 1125 and configured to receive an administrator ID and an administrator password. The account/password input unit 1122 may be a microprocessor or an ASIC. To be specific, when the user is about to set the storage device 100 to the protection status to start the storage device protection system 1120 and the detection unit 1121 determines that the storage device 100 and the key storage device 340 are both coupled to the host 1000, the account/password input unit 1122 displays an input window in a display unit (not shown) of the host 1000. The input window allows the user to input the administrator ID and the administrator password, so as to obtain the administrator ID and the administrator password input by the user. However, the present invention is not limited thereto, and the account/password input unit 1122 may also receive the administrator ID and the administrator password in any other way.

The ID acquiring unit 1123 is coupled to the protection control unit 1125. The ID acquiring unit 1123 may be a microprocessor or an ASIC. The ID acquiring unit 1123 is configured to obtain an ID of the storage device 100 as a first ID and an ID of the key storage device 340 as a second ID when the detection unit 1121 determines that the storage device 100 and the key storage device 340 are both coupled to the host 1000. For example, the ID acquiring unit 1123 respectively obtains the global unique ID (GUID) of the storage device 100 as the first ID and obtains the global unique ID (GUID) of the key storage device 340 as the second ID. However, the present invention is not limited thereto, and in other embodiments, the ID acquiring unit 1123 may also obtain other IDs of the storage device 100 and the key storage device 340 as the first ID and the second ID.

The encryption unit 1124 is coupled to the protection control unit 1125. The encryption unit 1124 may be a microprocessor or an ASIC. After the ID acquiring unit 1123 obtains the first ID and the second ID and the account/password input unit 1122 obtains the administrator ID and the administrator password, the encryption unit 1124 encrypts the administrator ID, the administrator password, the first ID, and the second ID into an encryption data. For example, the encryption unit 1124 performs the encryption operation by using SHA 512. However, the present invention is not limited thereto, and in other exemplary embodiments, the encryption unit 1124 may also perform the encryption operation by using RSA algorithm. The key used by the encryption unit 1124 for performing the encryption operation may be stored in a non-volatile memory (not shown) of the storage device protection system 1120.

After the encryption unit 1124 generates the encryption data, the protection control unit 1125 stores the encryption data to the key storage device 340. The protection control unit 1125 may be a microprocessor or an ASIC.

Figure 4B:
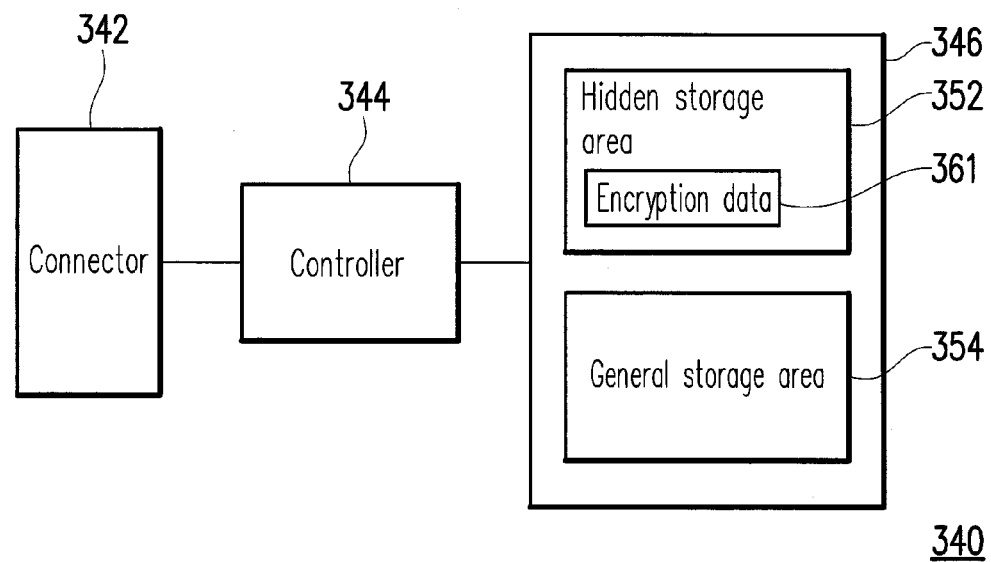
FIG. 4B is a schematic block diagram of a key storage device according to the first exemplary embodiment of the present invention.

FIG. 4B is a schematic block diagram of a key storage device according to the first exemplary embodiment of the present invention.

Referring to FIG. 4B, the key storage device 340 includes a connector 342, a controller 344, and a memory module 346.

The connector 342 is configured to connect the host 1000. In the present exemplary embodiment, the connector 342 complies with the USB interface standard. However, the type of the connector 342 is not limited in the present invention.

The controller 344 is coupled to the connector 342 and the memory module 346 and configured to execute a plurality of logic gates or control instructions implemented in a hardware form or a firmware form and perform various data operations on the memory module 346 according to commands issued by the host 1000. In particular, the controller 344 divides the storage space of the memory module 346 into a hidden storage area 352 and a general storage area 354. Herein the hidden storage area 352 can only be accessed by the storage device protection system 1120, while the general storage area 354 can be accessed by an operating system (OS) of the host 1000 or general application programs.

In the present exemplary embodiment, the protection control unit 1125 stores the encryption data 361 generated by the encryption unit 1124 into the hidden storage area 352 of the memory module 346. The protection control unit 1125 may access the hidden storage area 352 by using specific vender commands. It should be mentioned that when the protection control unit 1125 does not successfully store the encryption data to the key storage device 340, the protection control unit 1125 displays a locking failure message in a display unit (not shown) of the host 1000.

Additionally, in the present exemplary embodiment, the protection control unit 1125 further instructs the controller 104 of the storage device 100 according to vender commands to set an access mode of the storage device 100 as a protection status according to the administrator ID and the administrator password obtained by the account/password input unit 1122.

Thereby, the administrator ID and the administrator password set up by a user are backed up to the key storage device 340, and the access mode of the storage device 100 is set as the protection status according to the administrator ID and the administrator password. Then, the user may unlock the storage device 100 according to the administrator ID and the administrator password. Particularly, when the user forgets the administrator ID and the administrator password, the user may unlock the storage device 100 by using the key storage device 340. Below, how the storage device protection system 1120 unlocks the storage device 100 will be explained.

When the user is about to unlock the storage device 100 to start the storage device protection system 1120, the detection unit 1121 determines whether the storage device 100 and the key storage device 340 are both coupled to the host 1000. When the detection unit 1121 determines that the storage device 100 or the key storage device 340 is not coupled to the host 1000, the detection unit 1121 outputs an unlocking failure message in a display unit (not shown) of the host 1000.

After the detection unit 1121 determines that the storage device 100 and the key storage device 340 are both coupled to the host 1000, the ID acquiring unit 1123 obtains an ID of the storage device 100 and an ID of the key storage device 340.

Next, the protection control unit 1125 reads the encryption data 361 from the key storage device 340. As described above, the protection control unit 1125 may read the encryption data 361 from the hidden storage area 352 of the key storage device 340. Besides, the protection control unit 1125 sends the encryption data 361 to the decryption unit 1126.

Thereafter, the decryption unit 1126 decrypts the encryption data 361 to obtain an administrator ID, an administrator password, a first ID, and a second ID. Besides, the protection control unit 1125 determines whether the first ID obtained from the encryption data 361 is the same as the ID of the storage device 100 obtained by the ID acquiring unit 1123. The protection control unit 1125 also determines whether the second ID obtained from the encryption data 361 is the same as the ID of the key storage device 340 obtained by the ID acquiring unit 1123.

When the protection control unit 1125 determines that the first ID and the second ID obtained from the encryption data 361 are respectively the same as the IDs of the storage device 100 and the key storage device 340 obtained by the ID acquiring unit 1123, the protection control unit 1125 instructs the controller 104 of the storage device 100 to set the access mode of the storage device 100 as a non-protection status by using the administrator ID and the administrator password obtained by the decryption unit 1126. After the storage device 100 is set to the non-protection status, the OS or application programs of the host 1000 may access data in the storage device 100 through general commands.

It should be noted that the user may also couple the storage device 100 and a key storage device (not shown) different from the key storage device 340 to the host 1000, wherein an encryption data is stored in the other key storage device and the encryption data is generated by another storage device (not shown). In this example, the first ID and the second ID obtained from the encryption data are respectively an ID of the other storage device and an ID of the other key storage device. Herein the decryption unit 1126 can also decrypt the encryption data stored in the other key storage device. However, because in this case the first ID (i.e., the ID of the other storage device) obtained by the decryption unit 1126 is not the same as the ID of the storage device 100, after the protection control unit 1125 determines that the first ID is different from the ID of the storage device 100, it outputs an unlocking failure message in the display unit (not shown) of the host 1000.

Second Exemplary Embodiment

The storage device protection system in the second exemplary embodiment is substantially the same as that in the first exemplary embodiment, and the only difference is that in the second exemplary embodiment, the encryption unit 1124 and the decryption unit 1126 of the storage device protection system are disposed in a storage device.

Figure 5:
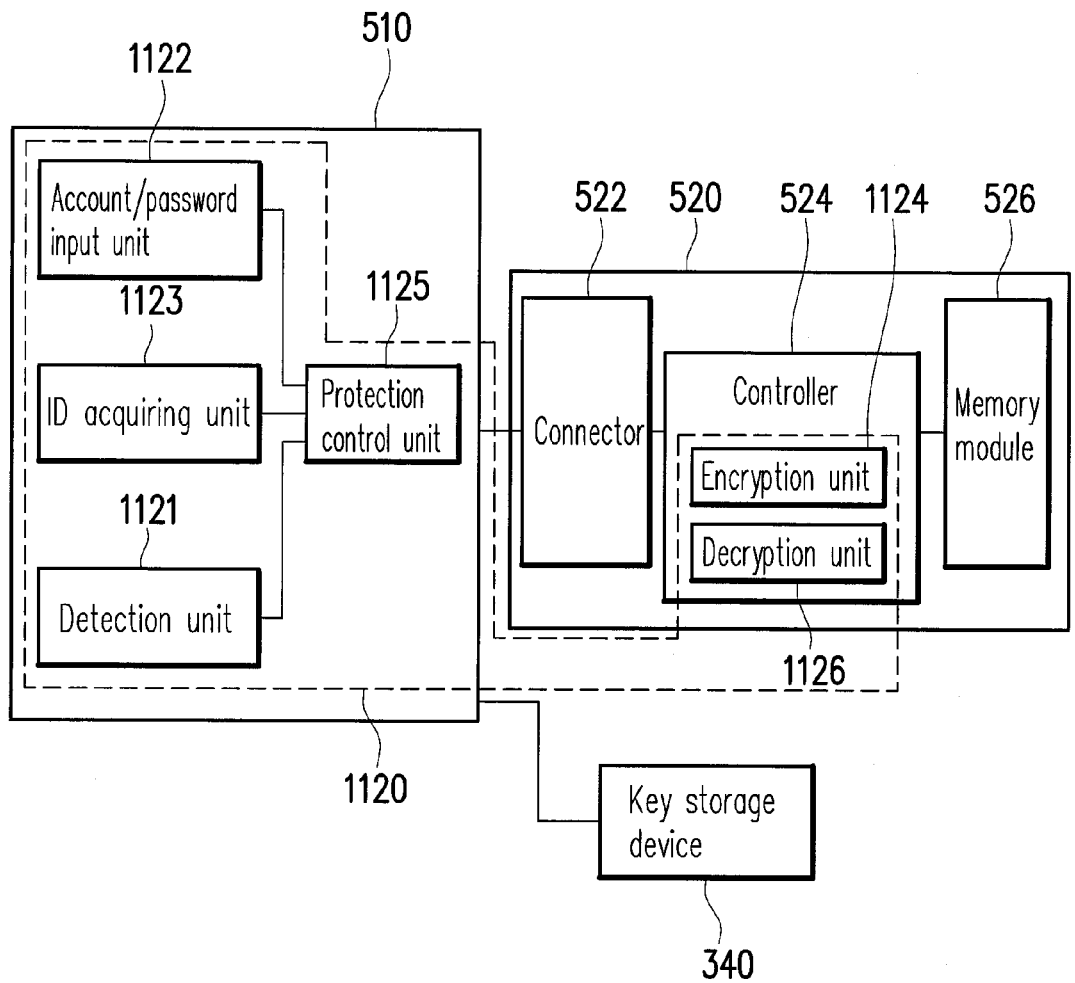
FIG. 5 is a diagram of a host, a storage device, and a key storage device according to a second exemplary embodiment of the present invention.

FIG. 5 is a diagram of a host, a storage device, and a key storage device according to the second exemplary embodiment of the present invention.

Referring to FIG. 5, the storage device 520 includes a connector 522, a controller 524, and a memory module 526.

The connector 522 is compliant with the SATA standard. However, the invention is not limited thereto, and the connector 522 may also be compliant with the PATA standard, the IEEE 1394 standard, the PCI express standard, the USB standard, the SD interface standard, the MS interface standard, the MMC interface standard, the CF interface standard, the IDE standard, or any other suitable standard.

The memory module 526 includes a plurality of physical blocks (not shown) for storing data.

The controller 524 is coupled to the connector 522 and the memory module 526 and configured to execute a plurality of logic gates or control instructions implemented in a hardware form or a firmware form, so as to perform various data operations on the memory module 526 according to commands issued by a host 510. Particularly, in the present exemplary embodiment, the encryption unit 1124 and the decryption unit 1126 of the storage device protection system 1120 are further disposed in the controller 524. The functions of the encryption unit 1124 and the decryption unit 1126 have been described above therefore will not be described herein.

The detection unit 1121, the account/password input unit 1122, the ID acquiring unit 1123, and the protection control unit 1125 of the storage device protection system 1120 are disposed in the host 510. The functions of the detection unit 1121, the account/password input unit 1122, the ID acquiring unit 1123, and the protection control unit 1125 have been described above therefore will not be described herein.

To be specific, because the encryption unit 1124 and the decryption unit 1126 are disposed in the controller 524, the protection control unit 1125 sends the administrator ID, the administrator password, the first ID, and the second ID to the controller 524 to allow the encryption unit 1124 to encrypt aforementioned information into an encryption data. Besides, the controller 524 sends the encryption data back to the protection control unit 1125 to allow the protection control unit 1125 to issue commands to the key storage device 340 and store the encryption data into the key storage device 340. On the other hand, after the decryption unit 1126 decrypts the encryption data, the controller 524 sends the administrator ID, the administrator password, the first ID, and the second ID to the protection control unit 1125.

It should be mentioned that the disposition of various components of the storage device protection system 1120 in the second exemplary embodiment is only an example. The disposition of the storage device protection system 1120 is not limited in the present invention, and the storage device protection system 1120 may have different dispositions in other embodiments.

In the present embodiment, the storage device protection system 1120 sets an access mode of the storage device 520 as a protection status, encrypts related validation data into an encryption data, and stores the encryption data into the key storage device 340. During the unlocking process, the storage device protection system 1120 reads the encryption data from the key storage device 340 and sets the access mode of the storage device 520 as a non-protection status. This unlocking process has been described above therefore will not be described herein.

Third Exemplary Embodiment

In the first exemplary embodiment, the detection unit, the account/password input unit, the ID acquiring unit, the encryption unit, the protection control unit, and the decryption unit of the storage device protection system are implemented as hardware structures. However, the present invention is not limited thereto, and in the third exemplary embodiment, the detection unit, the account/password input unit, the ID acquiring unit, the encryption unit, the protection control unit, and the decryption unit of the storage device protection system are implemented as software functions.

Program codes for accomplishing functions of the detection unit, the account/password input unit, the ID acquiring unit, the encryption unit, the protection control unit, and the decryption unit of the storage device protection system may be installed in and ran by a host. For example, when the program code of the storage device protection system is executed, a user interface is displayed in a display unit (not shown) to interact with a user. Or, the storage device and the key storage device may also be controlled through commands. Below, the operation of the program code will be explained with reference to accompanying flowcharts.

Figure 6:
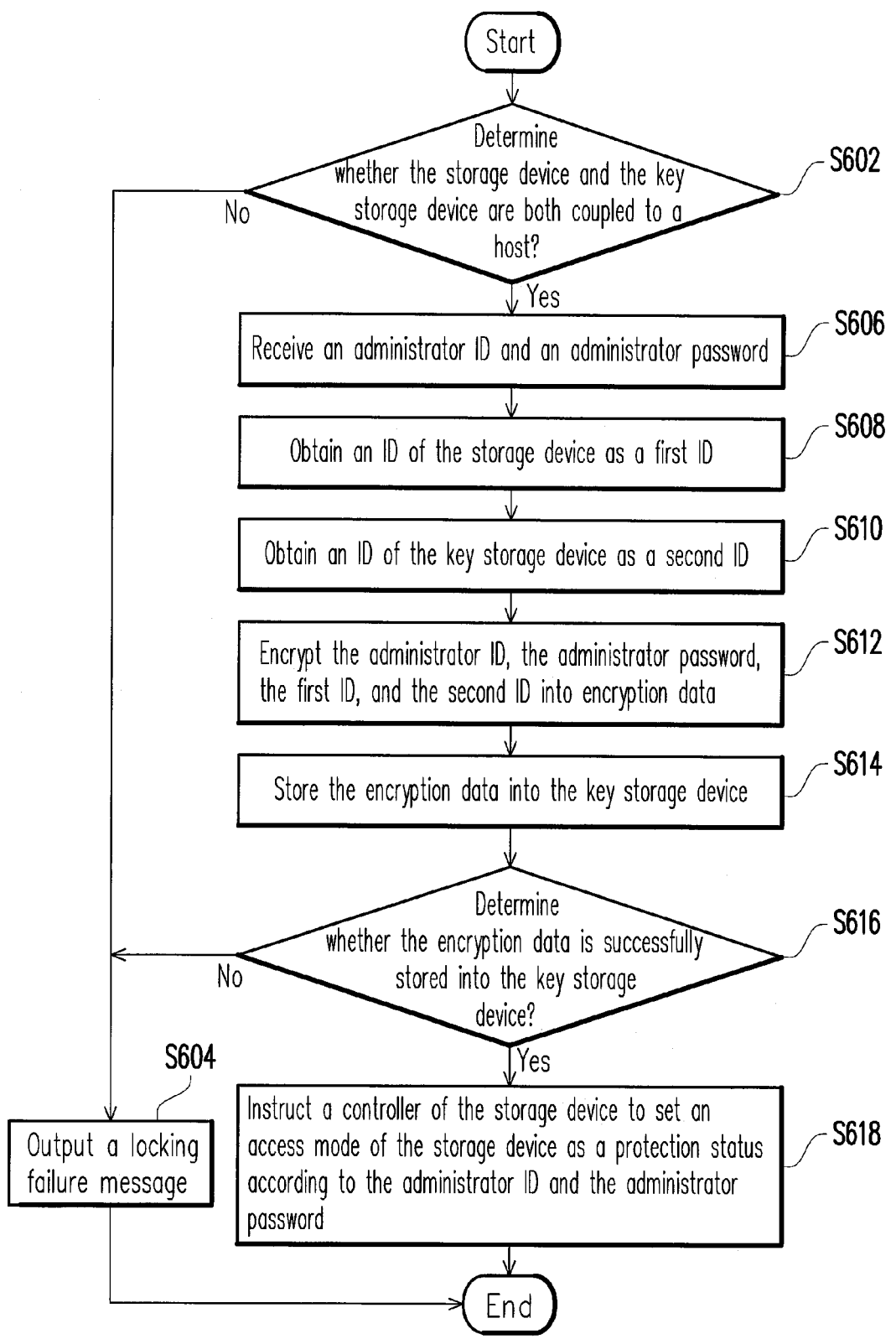
FIG. 6 is a flowchart of a storage device locking method according to a third exemplary embodiment of the present invention.

FIG. 6 is a flowchart of a storage device locking method according to the third exemplary embodiment of the present invention.

Referring to FIG. 6, when a user starts a storage device protection system to set up an administrator ID and an administrator password and lock a storage device, in step S602, the program code of the storage device protection system determines whether the storage device and the key storage device are both coupled to a host. If the storage device or the key storage device is not coupled to the host, in step S604, the program code of the storage device protection system outputs a locking failure message. After that, the procedure illustrated in FIG. 6 is terminated.

If the storage device and the key storage device are both coupled to the host, in step S606, the program code of the storage device protection system receives an administrator ID and an administrator password. To be specific, an input interface is displayed in a display of the host and the user is requested to set up the administrator ID and the administrator password.

Then, in step S608, the program code of the storage device protection system obtains an ID of the storage device as a first ID, and in step S610, the program code of the storage device protection system obtains an ID of the key storage device as a second ID. Next, in step S612, the program code of the storage device protection system encrypts the administrator ID, the administrator password, the first ID, and the second ID into an encryption data, and in step S614, the program code of the storage device protection system stores the encryption data into the key storage device.

Next, in step S616, the program code of the storage device protection system determines whether the encryption data is successfully stored into the key storage device.

If the encryption data is not successfully stored into the key storage device, step S604 is executed. If the encryption data is successfully stored into the key storage device, in step S618, the program code of the storage device protection system instructs a controller of the storage device to set an access mode of the storage device as a protection status according to the administrator ID and the administrator password. For example, the program code of the storage device protection system sends the administrator ID and the administrator password to the controller of the storage device through a vender command. The controller stores data of the administrator ID and the administrator password into a rewritable non-volatile memory module or a register in the controller. After the controller receives the vender command, it sets the access mode of the storage device as a protection status and sets up a flag to indicate that the storage device is protected by a password. Thereafter, the procedure illustrated in FIG. 6 is terminated.

Figure 7:
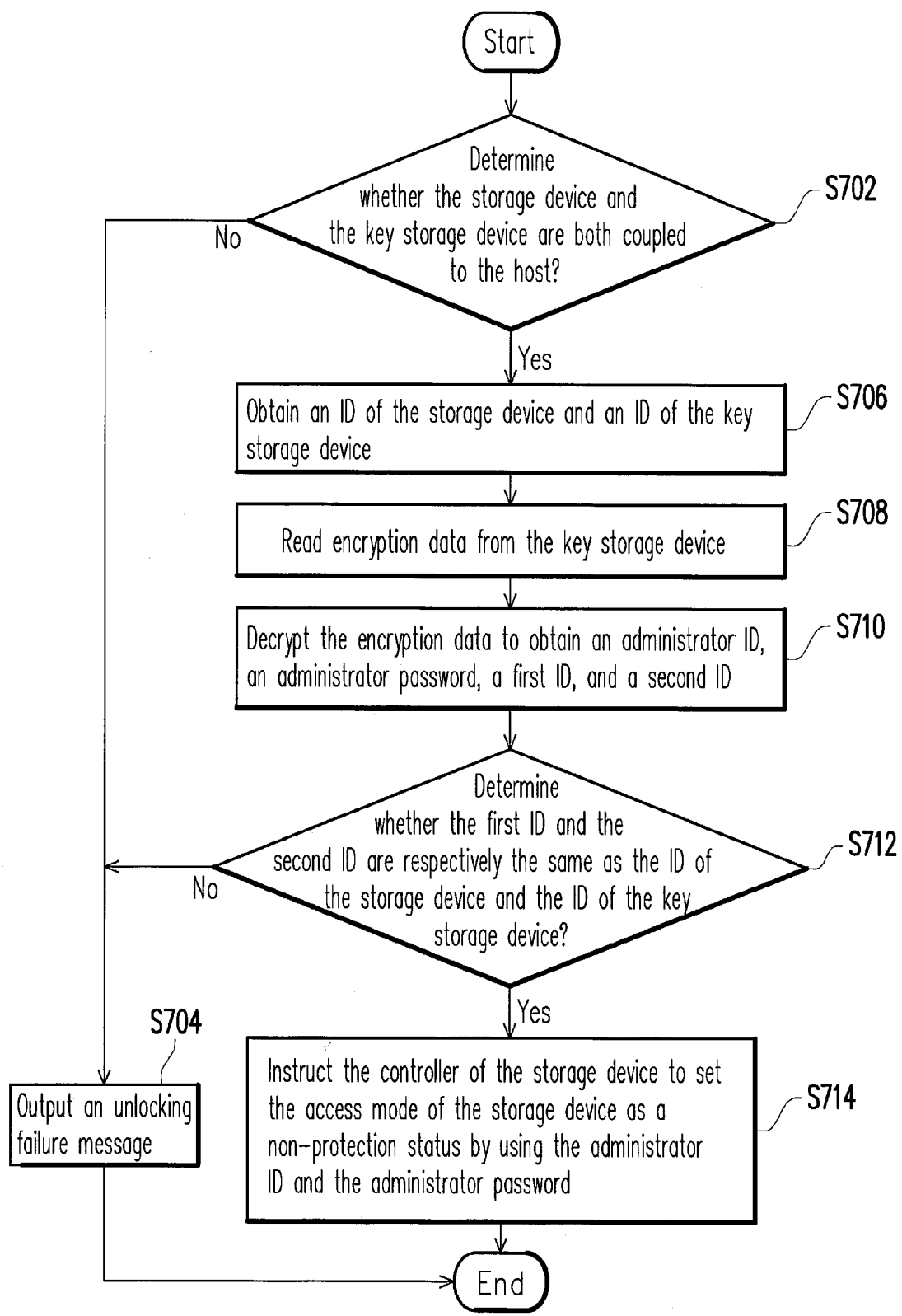
FIG. 7 is a flowchart of a storage device unlocking method according to the third exemplary embodiment of the present invention.

FIG. 7 is a flowchart of a storage device unlocking method according to the third exemplary embodiment of the present invention.

In step S702, the program code of the storage device protection system determines whether the storage device and the key storage device are both coupled to the host.

If the storage device or the key storage device is not coupled to the host, in step S704, the program code of the storage device protection system outputs an unlocking failure message and the procedure illustrated in FIG. 7 is terminated.

If the storage device and the key storage device are both coupled to the host, in step S706, the program code of the storage device protection system obtains an ID of the storage device and an ID of the key storage device. Then, the program code of the storage device protection system reads an encryption data from the key storage device (step S708) and decrypts the encryption data to obtain an administrator ID, an administrator password, a first ID, and a second ID (step S710).

Next, in step S712, the program code of the storage device protection system determines whether the first ID and the second ID are respectively the same as the ID of the storage device and the ID of the key storage device.

If the first ID is different from the ID of the storage device or the second ID is different from the ID of the key storage device, step S704 is executed. After that, the procedure illustrated in FIG. 7 is terminated.

If the first ID is the same as the ID of the storage device and the second ID is the same as the ID of the key storage device, in step S714, the program code of the storage device protection system instructs the controller of the storage device to set the access mode of the storage device as a non-protection status by using the administrator ID and the administrator password.

As described above, the exemplary embodiments of the present invention provide methods for locking and unlocking a storage device and a storage device protection system using the same, in which an administrator ID, an administrator password, an ID of the storage device, and an ID of a key storage device are encrypted all together and stored into the key storage device. Whether a storage device and a key storage device coupled to a host when the storage device is unlocked are the storage device and the key storage device coupled to the host when the storage device is locked can be determined by using aforementioned IDs. Thereby, the storage device is prevented from being unlocked by using a wrong key storage device. Additionally, when a user forgets the administrator ID or the administrator password, the user can unlock the storage device by using the key storage device coupled to the host when the storage device is locked. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A system, comprising:
a storage device;
a key storage device; and
a host, configured to:
determine whether the storage device and the key storage device are both coupled to the host;
receive an administrator identification (ID) and an administrator password;
output a locking failure message if the storage device or the key storage device is not coupled to the host;
obtain an ID of the storage device as a first ID and an ID of the key storage device as a second ID when the storage device and the key storage device are both coupled to the host;
encrypt the administrator ID, the administrator password, the first ID, and the second ID into encryption data;
store the encryption data into the key storage device; and
instruct a controller of the storage device to set an access mode of the storage device as a protection status according to the administrator ID and the administrator password.

2. The system according to claim 1, wherein the key storage device has a hidden storage area, and the host stores the encryption data into the hidden storage area of the key storage device.

3. The system according to claim 1, wherein the storage device is a solid state drive (SSD), and the key storage device is a flash drive.

4. A system, comprising:
a storage device;
a key storage device; and
a host, configured to:
determine whether the storage device and the key storage device are both coupled to the host;
obtain an ID of the storage device and an ID of the key storage device when the storage device and the key storage device are both coupled to the host;
output a unlocking failure message if the storage device or the key storage device is not coupled to the host;
read encryption data from the key storage device;
decrypt the encryption data to obtain an administrator ID, an administrator password, a first ID, and a second ID;
determine whether the first ID and the second ID are respectively the same as the ID of the storage device and the ID of the key storage device; and
when the first ID and the second ID are respectively the same as the ID of the storage device and the ID of the key storage device, instruct a controller of the storage device to set an access mode of the storage device as a non-protection status by using the administrator ID and the administrator password.

5. The system according to claim 4, wherein the key storage device has a hidden storage area, and the encryption data is stored in the hidden storage area of the key storage device.

6. The system according to claim 4, wherein the storage device is a SSD, and the key storage device is a flash drive.

7. A storage device locking method, comprising:
determining whether a storage device and a key storage device are both coupled to a host;
when the storage device or the key storage device is not coupled to the host, outputting a locking failure message; and
executing a locking operation when the storage device and the key storage device are both coupled to the host, wherein the locking operation comprises:

receiving an administrator identification (ID) and an administrator password;

obtaining an ID of the storage device as a first ID;

obtaining an ID of the key storage device as a second ID;

encrypting the administrator ID, the administrator password, the first ID, and the second ID into encryption data;

storing the encryption data into the key storage device;

determining whether the encryption data is successfully stored to the key storage device; and when the encryption data is successfully stored to the key storage device, instructing a controller of the storage device to set an access mode of the storage device as a protection status according to the administrator ID and the administrator password.

8. The storage device locking method according to claim 7, wherein the key storage device has a hidden storage area, and the step of storing the encryption data to the key storage device comprises:

storing the encryption data to the hidden storage area of the key storage device.

9. The storage device locking method according to claim 7, wherein the storage device is a SSD, and the key storage device is a flash drive.

10. The storage device locking method according to claim 7 further comprising:

when the storage device or the key storage device is not coupled to the host, outputting a locking failure message.

11. The storage device locking method according to claim 7, wherein the locking operation further comprises:

when the encryption data is not successfully stored to the key storage device, outputting a locking failure message.

12. A storage device unlocking method, comprising:

determining whether a storage device and a key storage device are both coupled to a host;

when the storage device or the key storage device is not coupled to the host, outputting a unlocking failure message; and when the storage device and the key storage device are both coupled to the host, executing an unlocking operation, wherein the unlocking operation comprises:

obtaining an identification (ID) of the storage device and an ID of the key storage device;

reading encryption data from the key storage device;

decrypting the encryption data to obtain an administrator ID, an administrator password, a first ID, and a second ID;

determining whether the first ID and the second ID are respectively the same as the ID of the storage device and the ID of the key storage device;

when the first ID and the second ID are respectively the same as the ID of the storage device and the ID of the key storage device, instructing a controller of the storage device to set an access mode of the storage device as a non-protection status by using the administrator ID and the administrator password.

13. The storage device unlocking method according to claim 12 further comprising:

when the storage device or the key storage device is not coupled to the host, outputting an unlocking failure message.

14. The storage device unlocking method according to claim 12, wherein the unlocking operation further comprises:

when the first ID is not the same as the ID of the storage device or the second ID is not the same as the ID of the key storage device, outputting an unlocking failure message.

15. The storage device unlocking method according to claim 12, wherein the key storage device has a hidden storage area, and the encryption data is stored in the hidden storage area of the key storage device.

16. The storage device unlocking method according to claim 12, wherein the storage device is a SSD, and the key storage device is a flash drive.

* * * * *